No. 865,583. PATENTED SEPT. 10, 1907.
H. H. FULLER.
TWO SPEED GEAR FOR MOTOR CYCLES.
APPLICATION FILED MAR. 20, 1907.
2 SHEETS—SHEET 1.
Fig. 1.
Fig. 2.
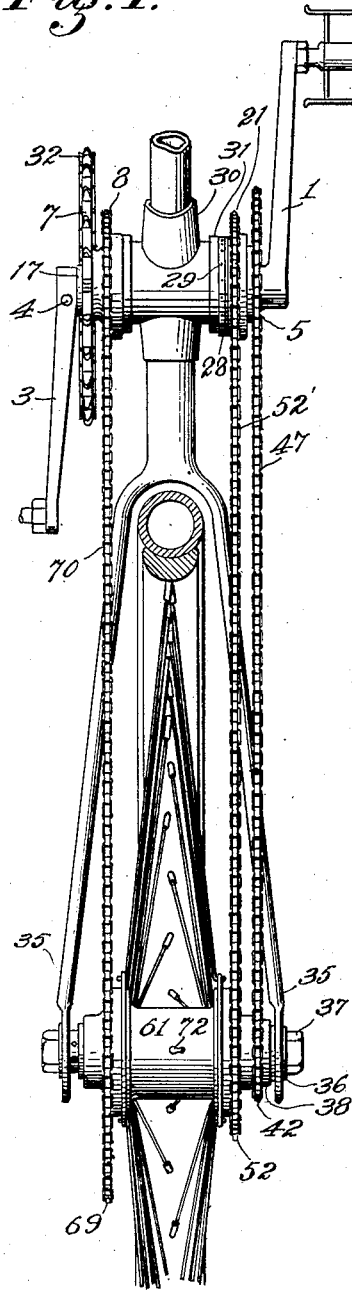
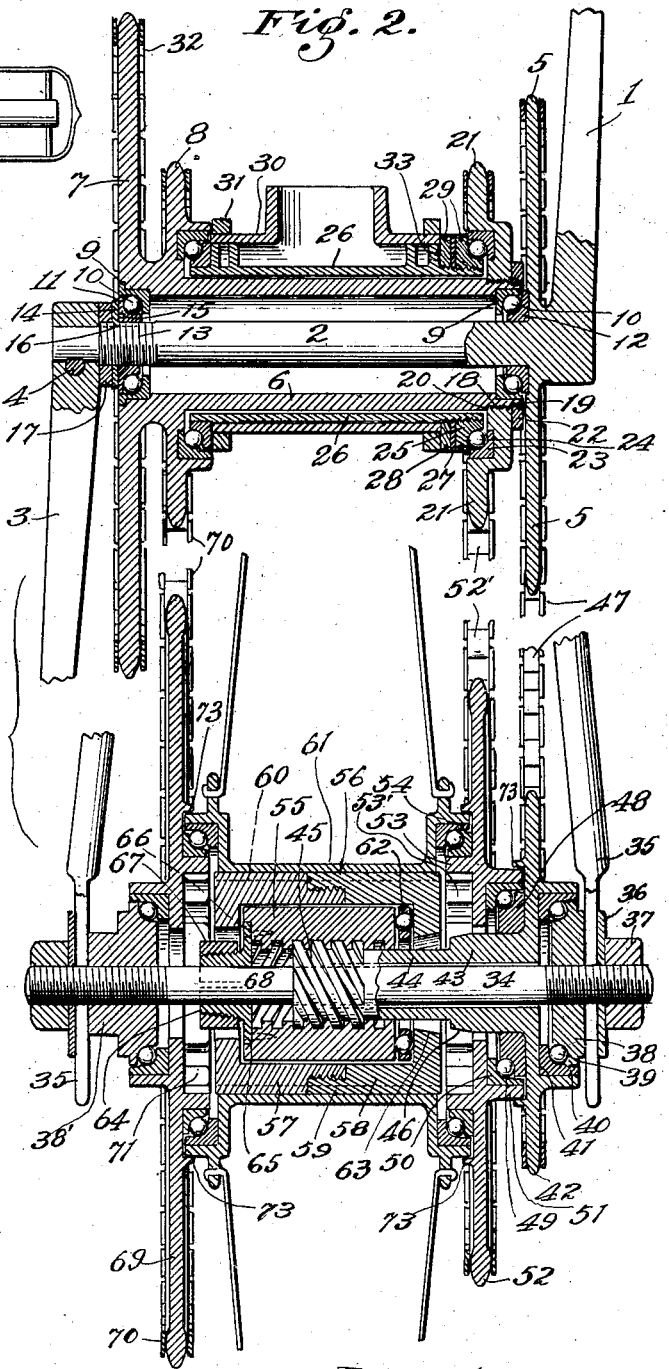
Witnesses
C. C. Holly
J. Townsend
Inventor
Harvey H. Fuller
by James R. Townsend
his atty No. 865,583. PATENTED SEPT. 10, 1907.
H. H. FULLER.
TWO SPEED GEAR FOR MOTOR CYCLES.
APPLICATION FILED MAR. 20, 1907.
2 SHEETS—SHEET 2.
Fig. 3. Fig. 4.
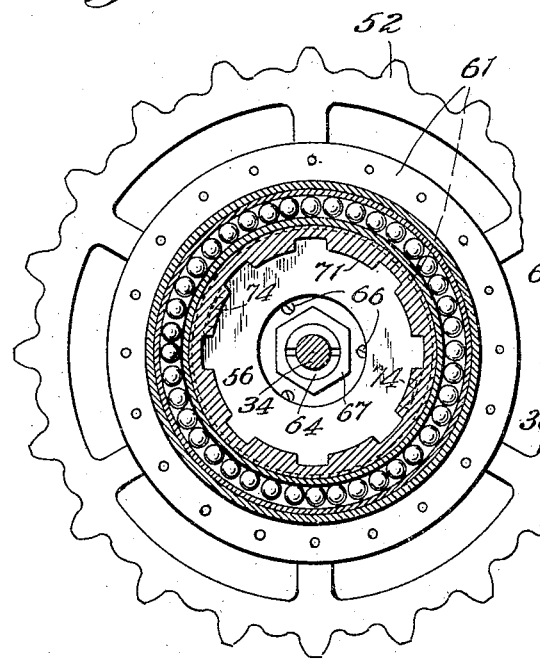
Fig. 5. Fig. 6. Fig. 7.
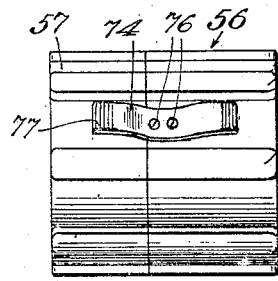 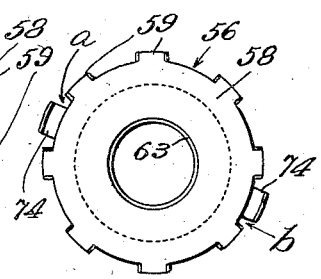
Fig. 8. Fig. 9. Fig. 10.
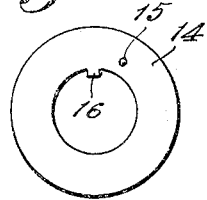 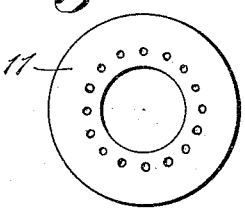
Witnesses
C. C. Holly
J. Townsend.
Inventor
Harvey H. Fuller
by James R. Townsend
his Atty

UNITED STATES PATENT OFFICE.

HARVEY H. FULLER, OF LOS ANGELES, CALIFORNIA.

TWO-SPEED GEAR FOR MOTOR-CYCLES.

No. 865,583.

Specification of Letters Patent.

Patented Sept. 10, 1907.

Application filed March 20, 1907. Serial No. 363,515.

*To all whom it may concern:*

Be it known that I, HARVEY H. FULLER, a citizen of the United States, residing at Los Angeles, in the county of Los Angeles and State of California, have invented a new and useful Two-Speed Gear for Motor-Cycles, of which the following is a specification.

An object of this invention is to provide a two-speed gear for motor cycles which is adapted to vary the speed of the machine during the travel of the same over roads, without causing a shock or jolt to the same, or injuring any of the parts by an unnecessary or excessive amount of friction, and to accomplish a change of speed by the movement of the pedals without necessitating the operator of the machine to change his position or to employ any cumbersome mechanism for this purpose.

Another object of the invention is to provide a device of this kind which may be used in connection either with self-propelled vehicles of the ordinary type of machine in present use, or with specially-constructed machines.

Another object of the invention is to provide a simple and efficient device for readily climbing hills or traveling through sandy or loamy soils; or, in fact, in any place where a great amount of power is required.

Another object of the invention is to provide a two-speed drive for motor cycles with two chains operating two sprockets of different sizes, and which may be thrown into and out of motion by simply actuating the pedals in a forward or rearward direction.

Another object of the invention is to provide a drive for motor cycles which will permit the engine to move independently without moving the machine and also permit the machine to be moved along without moving the engine.

The accompanying drawings illustrate the invention.

Figure 1 is a plan view partly in section; Fig. 2, a sectional fragmentary plan; Fig. 3, a section on lines $x^3$—$x^3$, Fig. 4; Fig. 4, a section showing the different positions of the clutch in dotted lines; Fig. 5, a detail front elevation of the clutch-sleeve; Fig. 6, a detail end elevation of the clutch-sleeve; Fig. 7, an end view of the hub showing the teeth for engaging the clutch-sleeve; Fig. 8, an enlarged detail of the washer, showing feather and pin; and Fig. 9, an enlarged detail of the cone showing the holes to be engaged by pin of washer. Fig. 10 is a fragmentary section of the hub-shell and clutch-sleeve showing the interposed spring.

1 designates a crank having solidly connected therewith an axle 2. On the end of this axle is another crank 3 removably secured to it by cotter-pin 4. A sprocket 5 is integrally united with the axle 2 and crank 1, although this construction is not necessary, since it may be made separately and then attached in any usual manner.

A countershaft 6 incases the axle and extends to within close proximity of the sprocket 5. Countershaft 6 is provided with a rigid sprocket 7, which if desired, may be made independently of the countershaft 6 and attached in any usual manner. 8 is a sprocket also fixed on the countershaft 6.

9 are ball cups inclosing the balls 10 and holding the same against the surface of cones 11, 12, one of which,— namely, 11,—is provided with interior screw-threads which engage the screw-threaded portion 13 of the axle 2.

14 is a lock-washer provided with a stop pin 15 which engages holes in the cone 11. This lock-washer has a feather 16 on its interior periphery which engages a groove or slot in the axle 2 to secure positive engagement therewith, and to prevent the independent revolution of the same on the axle. This lock-washer is held firmly against the cone by means of a lock-nut 17 which engages the threads of the axle 2 and rigidly secures the cone to the axle. By this means the adjustment of the bearings is effected.

The aforementioned countershaft 6 is provided on its extremity with left-hand threads 18 and right-hand threads 19. The left-hand threads terminate in a shoulder 20. The sprocket 21 engages the left-hand threads 18 on the countershaft, and abuts against the shoulder 20 provided thereon. The lock-nut 22 engages the right-hand threads 19 and fixes the sprocket 21 against any revolution on and independent of the countershaft 6.

23 are ball-cups provided in the sprocket 21 and arranged to hold the balls 24 against the cones 25 which are screwed onto the eccentric 26 by means of a right-hand thread.

27 is a lock-washer which bears against the cone 25, and 28 is a lock-nut bearing against the lock-washer and screwed onto the end of the eccentric in order to fix the cone 25 against rotation. The lock-washer in this instance is not provided with a pin as in the first-named instance, to engage the cone, because the cone is stationary, and is merely a bearing for the balls 24 which revolve around the cone with the sprocket 21.

The cone and lock-nut are provided with spanner-holes 29 to be engaged by a wrench, whereby the adjustment is effected. The eccentric 26 is mounted within the hanger-bracket 30, and is fixed thereto by means of ring-clamps 31 which compress the hanger-bracket, causing the engagement of the walls of the bracket with the eccentric 26.

The eccentric itself is provided for the purpose of adjusting or tightening the chain 32 which connects with the prime-mover, not shown, the adjustment being effected by a spanner-wrench engaging the holes 33 provided in the eccentric.

34 is a stationary axle of the rear wheel of a motor-cycle.

35 is a slotted rear fork, the slotted portion being engaged by the axle.

36 is a washer bearing against the slotted end of the rear fork, and 37 a nut for clamping the axle in the fork 35.

38 are cones screwed on the axle and adapted to accommodate a plurality of balls 39 held in place by ball-cups 40. These ball-cups are rigidly fixed in a hollow boss 41 of the sprocket 42. This sprocket is formed integral with a sleeve 43 having a reduced portion 44 surrounding and incasing the axle 34, said reduced portion being provided with threads 45.

46 is an inclined annular surface provided on the sleeve 43.

The sprocket 42 is connected with the sprocket 5 by a chain 47. The sleeve 43 has a cone 48 arranged to accommodate a plurality of balls 49, and to form a bearing for the ball-cup 50 which is fixed in the annular hollow boss 51 of the high-speed sprocket 52, which sprocket is connected by a chain 52' with the sprocket 21. The sprocket 52 is independent of the sprocket 42 and revolves on the bearings 48 of the sleeve 43 and 54 of the boss 53. Said sprocket 52 is provided with internal teeth 53' provided in a boss 53 of said sprocket.

55 is a shifting nut which engages the screw threads 45 provided on the reduced portion 44 of the sleeve 43.

56 is a clutch-sleeve fitting over the shifting nut 55 and composed of two parts 57, 58, the two parts being screwed together to form a unit. This clutch-sleeve 56 is provided with external teeth 59 which snugly but loosely engage the internal teeth 60 provided in the hub-shell 61.

62 is a ball-thrust interposed between the shifting-nut 55 and the part 58 of the clutch-sleeve 56. The part 58 of the clutch-sleeve is provided with an annular taper or inclined surface 63, which taper or inclined surface is adapted, when the clutch-sleeve 56 is moved by the shifting-nut 55, to engage the inclined surface or taper 46 provided on the sleeve 43. Previous to this movement, however, the clutch-sleeve 56, by movement of the sprocket 42 through the pedals, is caused to engage the internal teeth 53' provided in the sprocket 52, which action couples the sprocket 52 with the hub-shell 61 and thereby causes the power from the engine to be transmitted to the rear wheel and the propulsion of the machine effected absolutely independent of the sprocket 42.

The shifting of the clutch-sleeve into engagement with the teeth 53', is caused by the foot movement of the pedals 1 and 3, and the continued movement of the pedals causes the inclined surface or taper 63 to ride upon and engage the inclined surface 46 of the sleeve 43 and lock the sleeve and sprocket 42 with the clutch-sleeve 56 and the hub-shell 61, whereby the device is propelled by the movement of the pedals in a forward direction, thus starting the initial combustion in the engine if the prime-mover be a gasolene engine. After the machine is started, a slight rearward pedaling throws the clutch-sleeve 56 off of the inclined surface 46, though still retaining engagement with the teeth 53' of the sprocket 52, this action serving to allow the engine to propel the vehicle irrespective and independent of the pedals.

64 is a threaded friction sleeve engaging the countersunk portion 65 in the shifting nut 55, and secured therein by screws 66. This friction sleeve is split and engaged by a nut 67 having a tapered thread which compresses the same upon the axle 34, thereby to prevent the rotation of said shifting nut with the movement or rotation of the reduced portion of the sleeve carrying the threads 45 which engage the shifting nut. The axle 34 is slightly smaller at 68 than at the remaining part of the axle in order to lessen the friction of the friction-sleeve upon the axle when engagement of the surfaces 63 and 46 has taken place. The friction of the friction-sleeve on the axle, however, is of course not sufficient to prevent lateral shifting. It is intended to prevent rotation of the shifting nut with the threads 45 provided on the sleeve 43. When shifted, the friction sleeve loosely engages the reduced or smaller portion 68 of the axle, and is then free to rotate with the rotating elements of the machine.

69 is a low-speed gear or a large sprocket-wheel connected by chain 70 with the small sprocket 8 mounted on countershaft 6. This sprocket 69 is provided with internal teeth 71 which are adapted to be engaged by portion 57 of the clutch-sleeve 56. The movement of the clutch-sleeve to engage the teeth 71 of the sprocket 69 is effected by rearward motion of the sprocket 42 through chain 47 and sprocket-wheel 5, which causes the shifting-nut 55 to travel in the direction of the teeth of said sprocket 69 and finally engage the same, whereby the high-speed gear is disengaged from the clutch and remains free to revolve independently of the hub.

The internal teeth of the sprockets and the outer points of the external teeth of the clutch-sleeve, are rounded to facilitate mutual engagement during the moving of the device. The clutch-sleeve is steadily revolving in the direction of the sprockets and is capable of being shifted during the revolution, either to one side or the other. The shifting and consequent engagement of the clutch with the teeth produces no shock, or an almost imperceptible one.

An oil-hole 72 is provided in the hub-shell 61 by means of which the interior mechanism may be properly lubricated. Oil holes, not shown, may also be provided in the clutch-sleeve to allow the oil to reach all the parts of the mechanism. The sprockets 42, 52, and 69 are provided with dust-proof caps 73 which are parts of the sprocket and preferably made integral therewith.

The cone 38' serves to adjust all of the bearings.

To prevent jarring, rattling, or slipping of the clutch-sleeve 56 and the disengagement of the clutch from the teeth of both the high and low speed sprockets, which is liable to occur during the travel of the machine over rough and uneven roads and through unequal vibrations of the enigne, I provide springs 74, preferably elliptical, which are arranged to be placed between the teeth 59 provided in the clutch-sleeve 56. They are located on opposite sides of the clutch, as shown at a and b, and fit into the space 75 provided therefor in the hub-shell. Said springs are secured in place by screws 76. The opposite ends of said springs are knurled, as seen at 77, to engage a similarly knurled portion 78 in the hub shell 61, which at opposite points thereof, as seen at c and d, has one tooth removed to accommodate the springs. These springs 74 permit of the movement of the clutch-sleeve 56 by the sprocket 42, and yet effectually prevent the accidental shifting and rattling of the various transmitting elements.

What I claim is:—

1. A fixed axle, a sleeve on said axle, a sprocket on said sleeve, a hub surrounding said sleeve and axle, variable speed transmitting elements on said axle, and means for clutching one or the other of said elements.

2. A fixed axle, a driving element on said axle, variable speed transmission elements on said axle and means on said driving element for causing an engagement with said driven elements.

3. The combination with a wheel having a hub and a fixed axle, of variable speed transmission gears loose on said axle, a clutch sleeve interposed between said hub and axle and in positive engagement with said hub, said sleeve being slidable with respect to said hub, a sleeve loosely surrounding said axle, and means carried and operable by said sleeve for moving said clutch sleeve into engagement with said gears.

4. The combination with a wheel having a hub and a fixed axle, of an initial-moving element on said axle, a high-speed gear on said element, a low-speed gear loose on said axle, a clutch sleeve carried by said hub and in constant engagement therewith, said clutch sleeve being shiftable relatively to said hub, and means carried by said initial-moving element for moving said clutch sleeve to engage said high-speed or said low-speed gears at different times during the revolution thereof.

5. The combination with a wheel having a hub and a fixed axle, of an initial moving element loose on said axle, said element provided with an inclined surface, a clutch sleeve engaging said hub, a high-speed gear loose on said element, a low-speed gear loose on said axle, and means operable by said initial moving element for shifting said clutch sleeve in engagement with one or the other of said gears and frictionally connecting said clutch sleeve with the inclined surface of said initial moving element.

6. The combination with a wheel having a hub and a fixed axle, of an initial moving element loose on said axle, a high speed gear loose on said element and a low speed gear loose on said axle, a clutch sleeve in engagement with said hub, means for shifting said clutch sleeve into engagement with one or the other of said gears, and means for locking said clutch sleeve on said initial moving element.

7. The combination with a wheel having a hub and a fixed axle, of an initial-moving element loose on said axle, a high-speed gear loose on said element and a low-speed gear loose on said axle, a clutch sleeve in engagement with said hub, means for shifting said clutch sleeve into engagement with one or the other of said gears, and means for positively locking said clutch sleeve on said high-speed gear and said initial-moving element.

8. The combination with a wheel having a hub and a fixed axle, of an initial-moving element loose on said axle, a high-speed gear loose on said element and a low-speed gear loose on said axle, a clutch sleeve in engagement with said hub, means for shifting said clutch sleeve into engagement with one or the other of said gears, and means for frictionally locking said clutch on said initial moving element.

9. The combination with a wheel having a hub and a fixed axle, of an initial-moving element loose on said axle, a high-speed gear loose on said element and a low-speed gear loose on said axle, a clutch sleeve in engagement with said hub, means for shifting said clutch sleeve into engagement with one or the other of said gears, means for shifting said clutch sleeve relatively to said hub to engage either said high speed or said low speed gear, and means for frictionally locking said sleeve on said initial-moving element.

10. The combination with a wheel having a hub, and an axle, of variable speed transmission elements loose on said axle, teeth on said elements, a clutch sleeve engaging said hub and arranged to engage said teeth and means for shifting said clutch sleeve.

11. A fixed axle, variable speed transmission elements on said axle, a hub, means engaging said hub and elements for causing a rotation of the same, and means for controlling said means.

12. The combination with a wheel having a hub, and a fixed axle, of an initial moving element loose on said axle, said element being provided with an inclined surface, a clutch sleeve engaging said hub, a high speed gear loose on said element, a low speed gear loose on said axle, means operable by said initial moving element for shifting said clutch to engage said high or low speed gears at different periods and frictionally connecting said clutch sleeve with the inclined surface of said initial moving element, and means for disengaging said clutch sleeve from said inclined surface.

13. The combination with a wheel having a hub and a fixed axle, of an initial moving element loose on said axle, a high speed gear on said element, a low speed gear loose on said axle, a clutch sleeve carried by said hub, and in constant engagement therewith, said clutch sleeve being shiftable relatively to said hub, a shifter on said initial moving element and operable thereby for moving said clutch sleeve, to engage said high speed or said low speed gears at different times during the revolution thereof.

14. The combination with a wheel having a hub and a stationary axle, of an initial moving element loose on said axle, said element being provided with an inclined surface and screw threads, a clutch sleeve engaging said hub, a high-speed gear loose on said element, a low-speed gear loose on said axle, a shifter engaging the threads on said initial-moving element for moving said clutch to engage said high or said low speed gears at different periods and frictionally connecting said clutch sleeve with the inclined surface of said initial-moving element, and means operable by the reverse movement of said initial-moving element for disengaging said clutch sleeve from said inclined surface.

15. The combination with a wheel having a hub and a stationary axle, of an initial-moving element loose on said axle, said element being provided with screw-threads and an annular inclined surface, a high speed gear loose on said element, a low speed gear loose on said axle, a clutch sleeve carried by said hub and in constant engagement therewith, said clutch sleeve being shiftable relatively to said hub, a shifter engaging the threads on said initial-moving element, and a ball-thrust interposed between said shifter and said clutch sleeve, said shifter serving to move said clutch into engagement with said gears and cause an engagement of said clutch with said inclined surface to connect said initial-moving element with said clutch and said low-speed gear.

16. The combination with a wheel having a hub, and an axle, of variable speed transmission elements loose on said axle, teeth on said elements, a clutch sleeve engaging said hub and arranged to engage said teeth, means for shifting said clutch sleeve, and means for preventing the disengagement of said clutch sleeve from the teeth of said element.

17. The combination with a wheel having a hub, and an axle, of variable speed transmission elements loose on said axle, teeth on said elements, a clutch sleeve engaging said hub and arranged to engage said teeth, means for shifting said clutch sleeve, and a spring for preventing the disengagement of said clutch sleeve.

In testimony whereof, I have hereunto set my hand at Los Angeles California this 11th day of March 1907.

HARVEY H. FULLER.

In presence of—
JAMES R. TOWNSEND,
ANTON GLOETZNER.